(12) United States Patent
Zichmanis (10) Patent No.: US 6,783,463 B2
(45) Date of Patent: Aug. 31, 2004

(54) GOLF PUTTER AND GRIP THEREFOR

(75) Inventor: Janis Zichmanis, Toronto (CA)

(73) Assignee: Pure Pendulum Corporation, Markham (CA)

( * ) Notice: Subject to any disclaimer, the term of this patent is extended or adjusted under 35 U.S.C. 154(b) by 0 days.

(21) Appl. No.: 10/103,913

(22) Filed: Mar. 25, 2002

(65) Prior Publication Data

US 2003/0181254 A1 Sep. 25, 2003

(51) Int. Cl.[7] ................................. A63B 53/14
(52) U.S. Cl. ................... 473/204; 473/313; 473/314; 473/300
(58) Field of Search ................... 473/300–303, 473/203–204, 206, 313, 314

(56) References Cited

U.S. PATENT DOCUMENTS

| | | | |
|---|---|---|---|
| 2,218,268 A | | 10/1940 | Reid |
| D128,266 S | | 7/1941 | Smith |
| 3,219,348 A | | 11/1965 | Dishner |
| 4,067,573 A | | 1/1978 | Key |
| 4,310,158 A | * | 1/1982 | Hoffman ............... 473/204 |
| 5,116,054 A | * | 5/1992 | Johnson ............... 473/240 |
| 5,452,891 A | | 9/1995 | Thomas |
| 5,454,564 A | | 10/1995 | Kronogard |
| 5,460,372 A | | 10/1995 | Cook |
| 5,571,050 A | | 11/1996 | Huang |
| 5,575,724 A | * | 11/1996 | Hannon et al. ............... 473/315 |
| 5,733,204 A | * | 3/1998 | Carrara ............... 423/300 |
| 5,782,705 A | * | 7/1998 | Solari ............... 473/300 |
| D399,282 S | | 10/1998 | Jarrett |
| D399,901 S | | 10/1998 | Beyer |
| 5,947,838 A | * | 9/1999 | Tkacs ............... 473/314 |
| 6,039,656 A | * | 3/2000 | Fireman ............... 473/131 |
| 6,123,625 A | | 9/2000 | Koblentz |
| 6,213,891 B1 | | 4/2001 | Moore |
| 6,435,976 B1 | * | 8/2002 | Galliers ............... 473/244 |
| 2003/0176234 A1 | * | 9/2003 | Sheets et al. ............... 473/300 |

* cited by examiner

Primary Examiner—Stephen Blau
(74) Attorney, Agent, or Firm—Patrick J. Hofbauer (57) ABSTRACT

A putter is disclosed and comprises a head, a shaft and a handle. The head has a rear and a front. The shaft defines a longitudinal axis, has an end operatively attached to and proximate the head and extends upwardly, rearwardly therefrom to an upper end. The handle has a second end operatively attached and contiguous to the upper end and extends longitudinally, upwardly to a first end. The handle has, on its front, a thumb-receiving surface, and, on respective sides, adjacent the second end, finger-receiving surfaces, and can be held in a grip wherein the thumbs point towards the head and lie parallel upon the thumb-receiving surface; the middle finger tips touch; in each hand, the forefinger lies against the thumb and against a respective finger-receiving surface and the middle finger lies against the forefinger and against a respective finger-receiving surface; and the ring and small fingers are intertwined.

6 Claims, 9 Drawing Sheets

GOLF PUTTER AND GRIP THEREFOR

FIELD OF THE INVENTION

The present invention relates to the field of golf putters, and particularly, to a golf putter which permits the use of a new gripping method and stroke therewith.

BACKGROUND OF THE INVENTION

Golf theory teaches that the putting stroke should be executed in generally pendulum-like fashion.

In the conventional method for putting, the hands of the golfer are typically located one beneath the other and grasp the shaft in a reverse overlap grip, thereby positioning one shoulder beneath the other. During the stroke, in order to approximate pendulum-like movement, a body adjustment is made, to compensate for the fact that the shoulders are not naturally level upon address of the ball.

While this conventional method has clearly proven satisfactory over time, it is difficult to execute with consistency, since the necessary body adjustment is a complex physical movement.

It is known in the prior art to provide a golf putter which admits the use of a grip wherein the hands of the golfer are level with one another, with thumbs disposed in side-by-side relation on the handle and index fingers disposed against opposite sides of the handle, in an attempt to eliminate the need for the aforementioned body adjustment. Exemplary in this regard are U.S. Pat. No. 3,219,348 (Dishner, Jr.), issued Nov. 23, 1965, as well as U.S. Pat. No. 4,067,573 (Key, Jr.), issued Jan. 10, 1978. However, in order to provide stability, the handle of each of these putters is constructed in substantially bulbous form, which is contrary to the present Rules of Golf as promulgated by the United States Golf Association.

Another attempt in the prior art is disclosed in U.S. Pat. No. 6,213,891 (Moore), issued Apr. 10, 2001. The putter of this reference includes a handle that is not bulbous, and as such, appears to be in compliance with the aforementioned Rules of Golf. However, in this putter, an extended handle is provided which bears against the sternum of the user in play. While this handle provides the necessary stability, the radical structure of this design can be unacceptable to golfers who do not wish to depart significantly from tradition, and can also draw attention and signify to observers that the golfer has difficulty with conventional putting.

SUMMARY OF THE INVENTION

As one aspect, the present invention includes a golf putter comprising a club head, a shaft, and a handle.

The club head has a rear part defining a heel, a front part defining a toe, a head axis extending between the head and the toe, a substantially planar sole which is arranged parallel to the head axis, a lateral axis lying in the plane of the sole and arranged normal to the head axis, and a planar striking face on one lateral side of the club head. The planar striking face is arranged parallel to the head axis and substantially transverse to the sole.

The shaft has a lower end operatively rigidly attached to the club head, an upper end disposed upwardly and rearwardly from the lower end, and a longitudinal axis extending between the upper end and the lower end. The longitudinal axis is disposed at an angle of 10–20° to a plane which is normal to the head axis and lies in a plane that is arranged substantially normal to the sole and includes the head axis.

The handle has a first end disposed substantially longitudinally upwardly from the upper end of the shaft and extends therefrom substantially longitudinally, downwardly to a second end operatively rigidly attached to the upper end of the shaft and contiguous therewith.

The handle is provided on its front, intermediate the first end and the second end, with a substantially flat thumb-receiving surface arranged substantially parallel to the lateral axis and to the longitudinal axis, and further is provided with a pair of substantially flat finger-receiving surfaces which are disposed, adjacent the second end, on opposite lateral sides of the handle and arranged substantially normal to the thumb-receiving surface. The handle is shaped and dimensioned to be gripped by the hands of a user in a grip wherein: the thumbs of the user point substantially towards the club head and are disposed in side-by-side relation upon the thumb-receiving surface; the index finger of each hand lies against the thumb of each hand and against a respective one of the finger-receiving surfaces; the tips of the middle fingers of said hands touch one another and lie against the rear of the handle, with portions of the middle finger of each hand lying against respective finger-receiving surfaces and against the index finger of said each hand; and the ring and small fingers of the hands are intertwined.

As other aspects of the present invention, the handle preferably tapers, both in lateral width and in thickness, as it extends from the first end to the second end, with the rates of taper, in both lateral width and in transverse thickness, being more pronounced adjacent the first end and the second end, thereby to define a flared portion of the handle including the first end, a substantially pointed portion of the handle including the second end and an intermediate body portion connecting the flared portion to the pointed portion.

As yet other aspects of the present invention, the thumb-receiving surface is preferably formed on the body portion of the handle and the finger-receiving surfaces are formed on the pointed portion of the handle.

As another aspect, the present invention includes a method of instruction pertaining to putting in golf which comprises guiding the golfer to grip the handle of a putter in a grip wherein the thumbs of the golfer point substantially towards the club head and are disposed in side-by-side relation upon the front of the handle; the index finger of each hand lies against the thumb of each hand and against a respective one of the sides of the handle; the tips of the middle fingers of said hands touch one another and lie against the rear of the handle, with portions of the middle finger of each hand lying against respective sides of the handle and against the index finger of said each hand; and the ring and small fingers of the hands are intertwined.

As another aspect, the present invention includes a grip for a golf putter. The putter is of the type having a club head and a shaft. The club head is of the type having a rear part defining a heel, a front part defining a toe, a head axis extending between the head and the toe, a substantially planar sole which is arranged parallel to the head axis and a lateral axis lying in the plane of the sole and arranged normal to the head axis. The shaft is of the type having a lower end operatively rigidly attached to the club head and proximate thereto, an upper end disposed upwardly, rearwardly from the club head and a longitudinal axis extending therebetween. The grip comprises an elongate handle having a first end and a second end; and means for rigidly connecting the handle to the shaft such that the first end is disposed substantially longitudinally upwardly from the upper end of the shaft and the second end is contiguous with the upper end of the shaft. The handle is provided on its front, intermediate the first end and the second end, with a substantially flat thumb-receiving surface arranged substantially parallel to the lateral axis and to the longitudinal axis, and further is provided with a pair of substantially flat finger-receiving surfaces which are disposed, adjacent the second end, on opposite lateral sides of the handle and arranged substantially normal to the thumb-receiving surface.

The handle is shaped and dimensioned to be gripped by the hands of a user in a grip wherein: the thumbs of the user point substantially towards the club head and are disposed in side-by-side relation upon the thumb-receiving surface; the index finger of each hand lies against the thumb of each hand and against a respective one of the finger-receiving surfaces; the tips of the middle fingers of said hands touch one another and lie against the rear of the handle, with portions of the middle finger of each hand lying against respective finger-receiving surfaces and against the index finger of said each hand; and the ring and small fingers of the hands are intertwined.

As another aspect of the invention, the means for rigidly connecting the handle to the shaft preferably comprises a socket provided in the handle for the shaft.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

DETAILED DESCRIPTION OF A PREFERRED EMBODIMENT

Figures 1, 2:
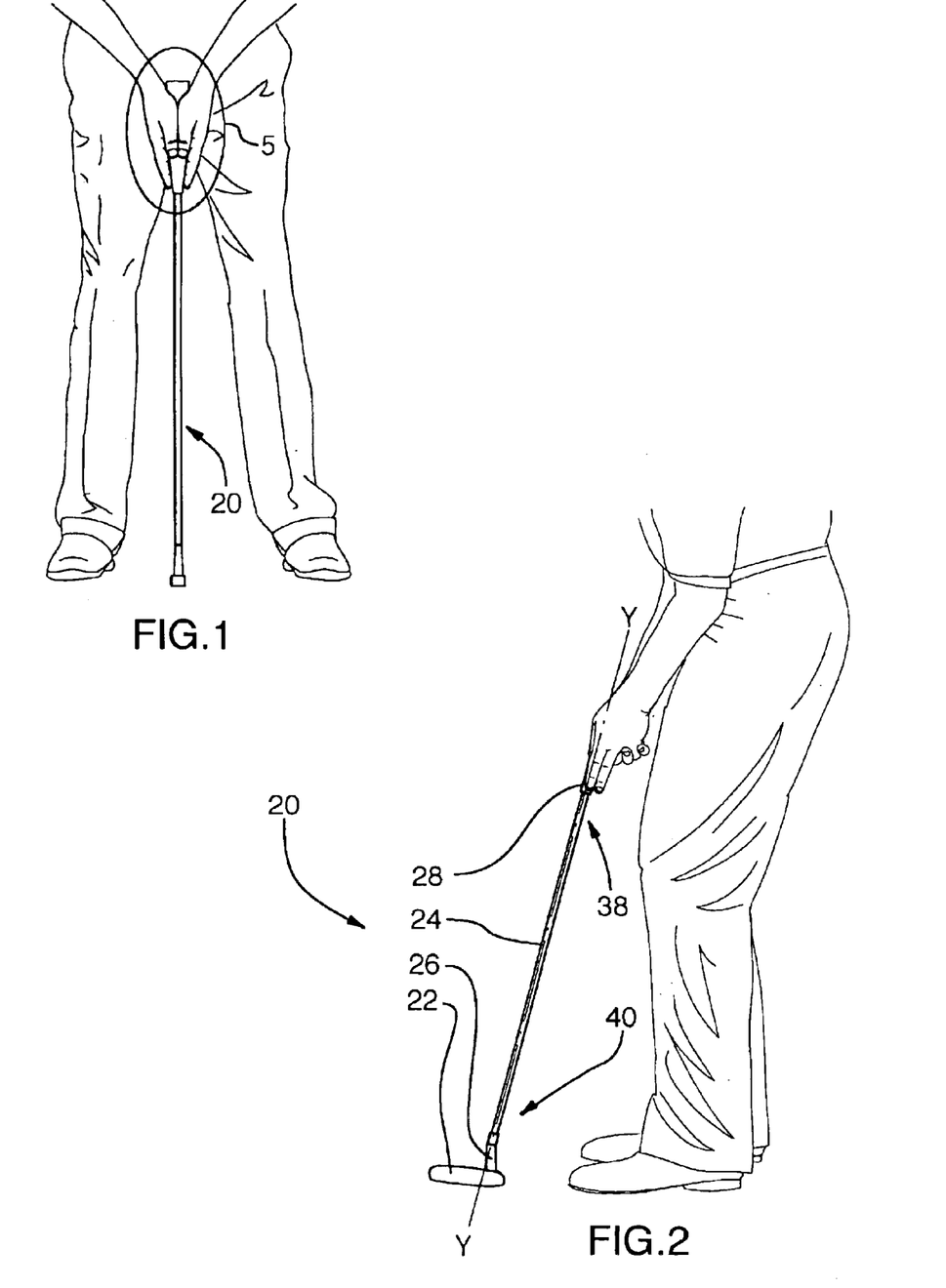
FIG. 1 is a front view of a golf putter according to a preferred embodiment of the invention in use by a golfer.
FIG. 2 is a side view of the putter and golfer of FIG. 1.

Referring now to FIG. 1 of the drawings, a golf putter according to a preferred embodiment of the present invention, grasped by a golfer in a manner more fully described in following paragraphs, is shown and designated with general reference numeral 20.

Generally, the golf putter 20 comprises a club head 22, a shaft 24, a stem 26 and an elongate handle 28, as illustrated in FIG. 2.

Figure 3:
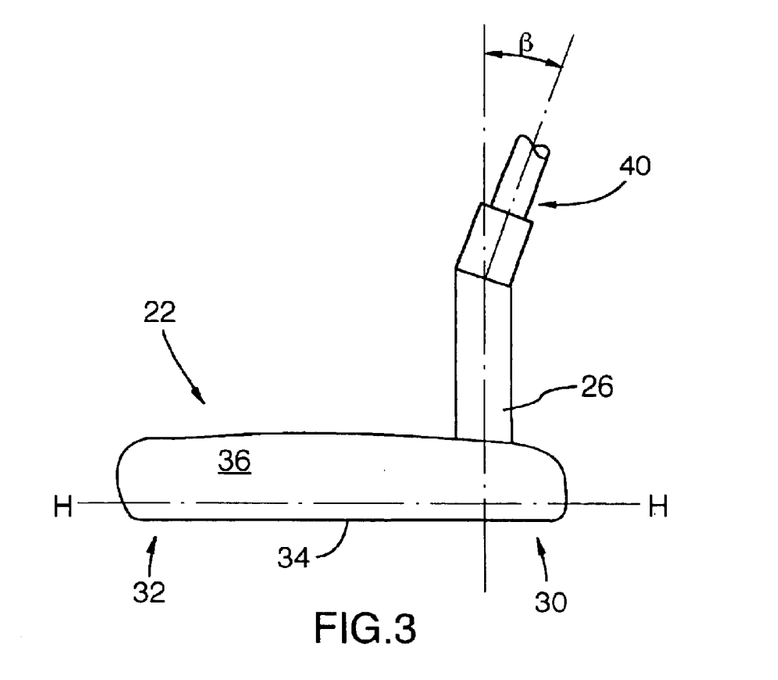
FIG. 3 is a partial front view of the putter of FIG. 1 (not to scale)
Figure 4:
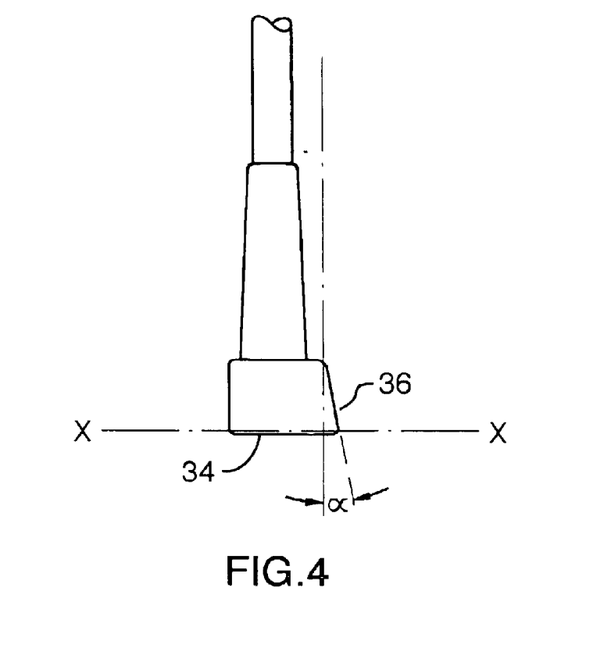
FIG. 4 is a partial side view of the putter of FIG. 1.

The club head 22, which is formed of steel and best illustrated in FIGS. 3 and 4, is of the mallet type which includes a rear part defining a heel 30, a front part defining a toe 32, a head axis H—H extending between the heel 30 and the toe 32, a substantially planar sole 34 which is arranged parallel to the head axis H—H, a lateral axis X—X lying in the plane of the sole 34 and arranged normal to the head axis H—H, and a planar striking face 36 on one lateral side of the club head 22 which is arranged parallel to the head axis H—H and substantially transverse to the sole 34. Particularly, the degree of loft, that is, the angle $\alpha$ between the vertical and striking face 36, is approximately 4%.

Figure 7:
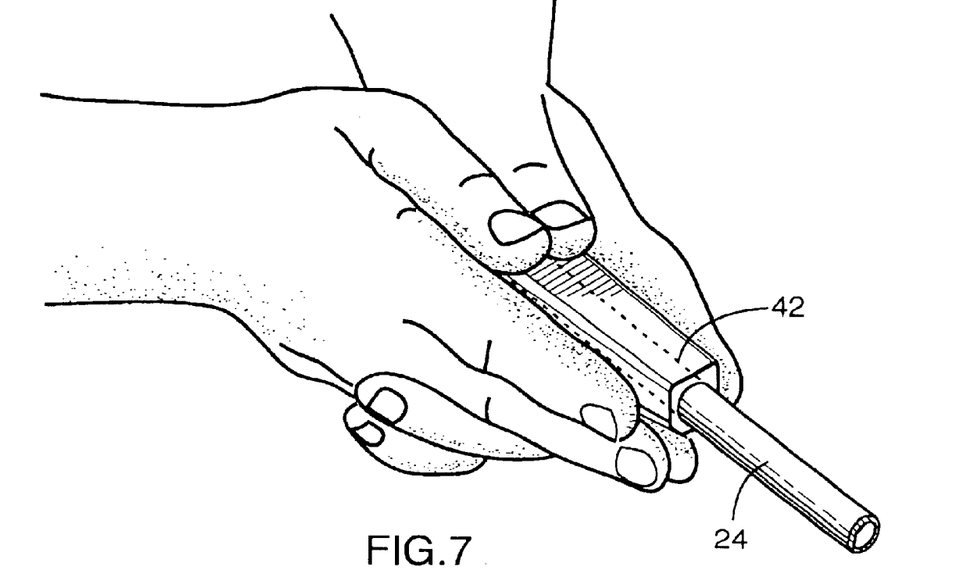
FIG. 7 is a front, side, bottom perspective view of the putter structure and hands of FIG. 5.
Figure 8:
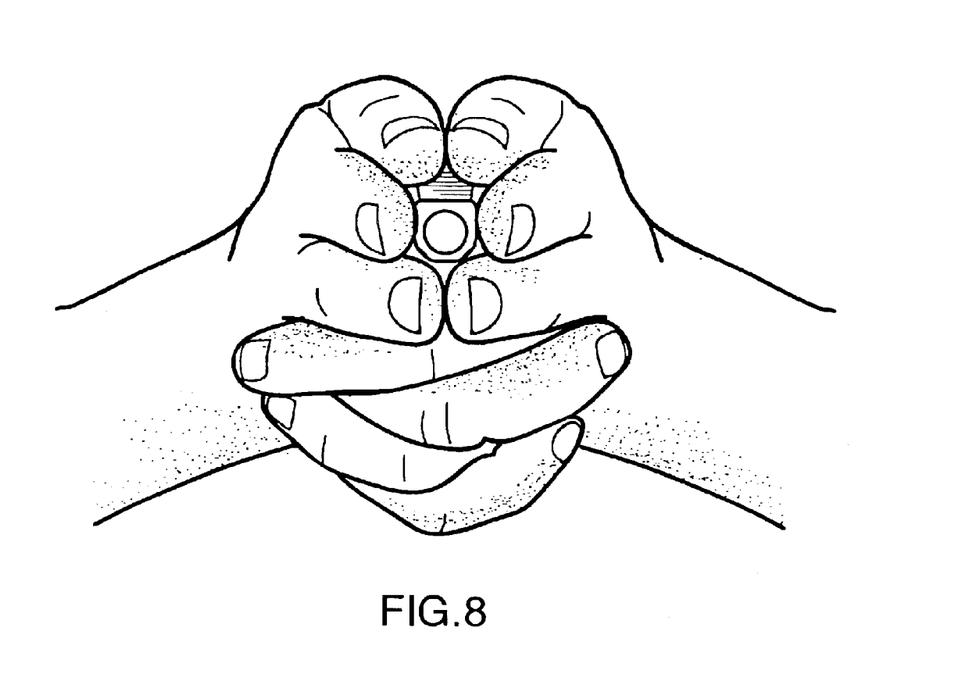
FIG. 8 is a bottom sectional view of the putter structure and hands of FIG. 5.
Figure 9:
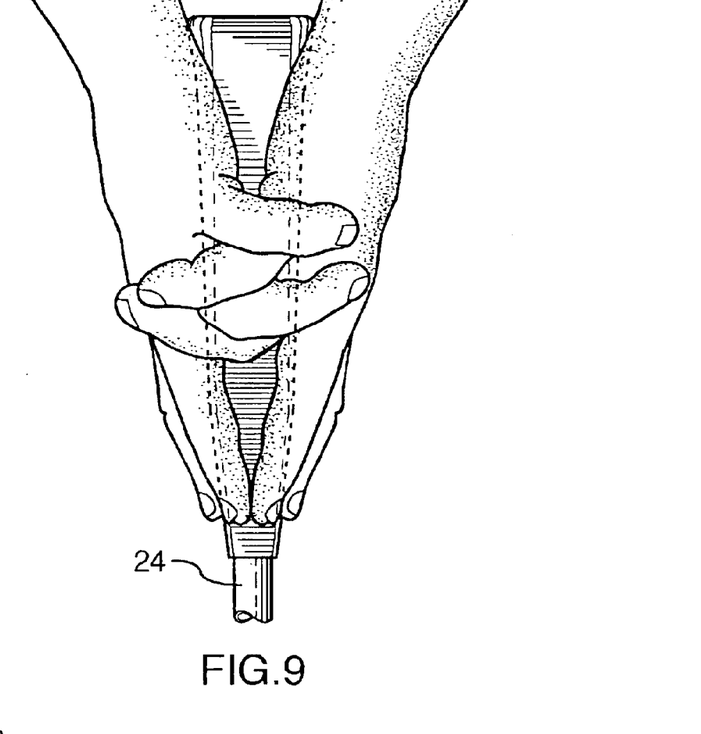
FIG. 9 is a rear view of the putter structure and hands of FIG. 5.
Figure 17:
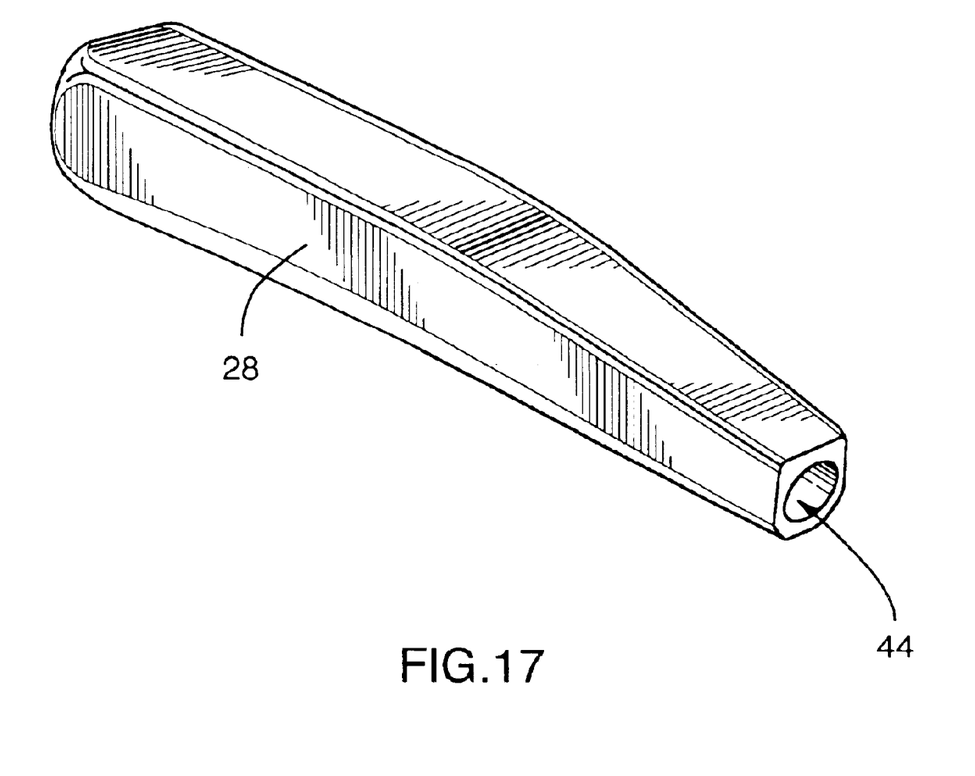
FIG. 17 is a view similar to FIG. 10, with the shaft removed for clarity.

As illustrated in FIG. 2, the shaft 24 has an upper end 38, a lower end 40 and a longitudinal axis Y—Y extending therebetween, and is formed of steel, integrally, with a shaft extension which extends longitudinally upwardly from the upper end 38 of the shaft 24 into a socket provided in the handle 28. For clarity, the shaft extension is shown in phantom outline in FIG. 7 and designated with reference numeral 42; the socket is indicated in FIG. 17 with general reference numeral 44.

As best seen in FIG. 4, the stem 26 rigidly extends from the lower end 40 of the shaft 24 to a point on the club head 22 adjacent its heel 30, operatively rigidly attaching the club head 22 to the lower end 40 of the shaft 24 such that the upper end 38 of the shaft 24 is disposed upwardly and rearwardly from the lower end 40 and such that the longitudinal axis Y—Y lies in a plane that is arranged substantially normal to the sole 34 and includes the head axis H—H and is disposed at an angle $\beta$ of 10° to a plane that is normal to the head axis H—H, thereby to suitably offset the handle 28 from the club head 22 and provide for a natural stance in use, as described below. Manners by which a club head 22 can be coupled to a shaft 24 via a stem 26 are well-known to persons of ordinary skill in the art, and as such, the precise manner of such attachment in the preferred embodiment is not described herein in detail.

Figures 5, 6:
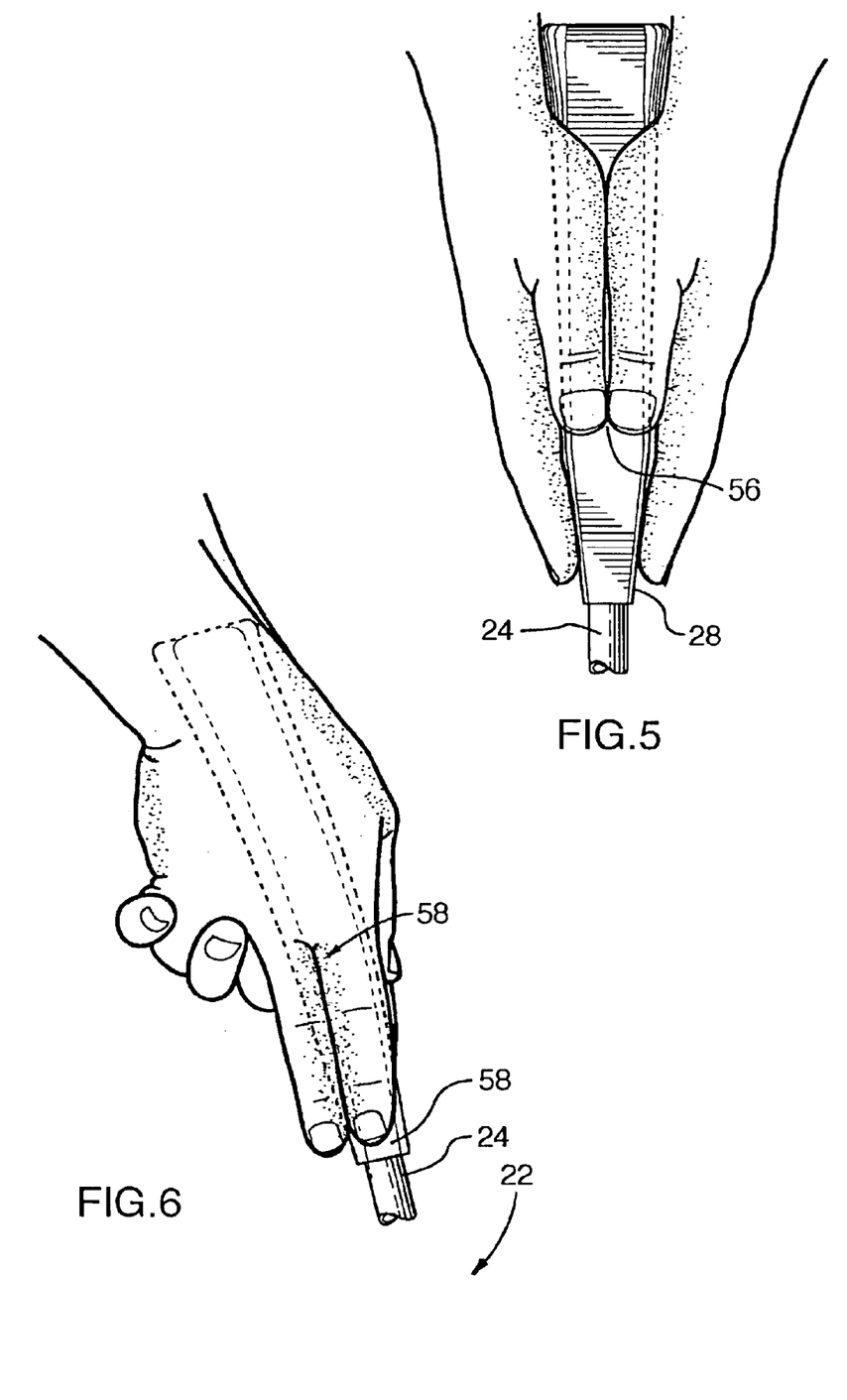
FIG. 5 is an enlarged view of the encircled area designated by numeral 5 in FIG. 1, showing part of the putter and the hands of the golfer, with hidden parts of the putter shown in phantom outline.
FIG. 6 is a side view of the putter structure and hands of FIG. 5.
Figure 10:
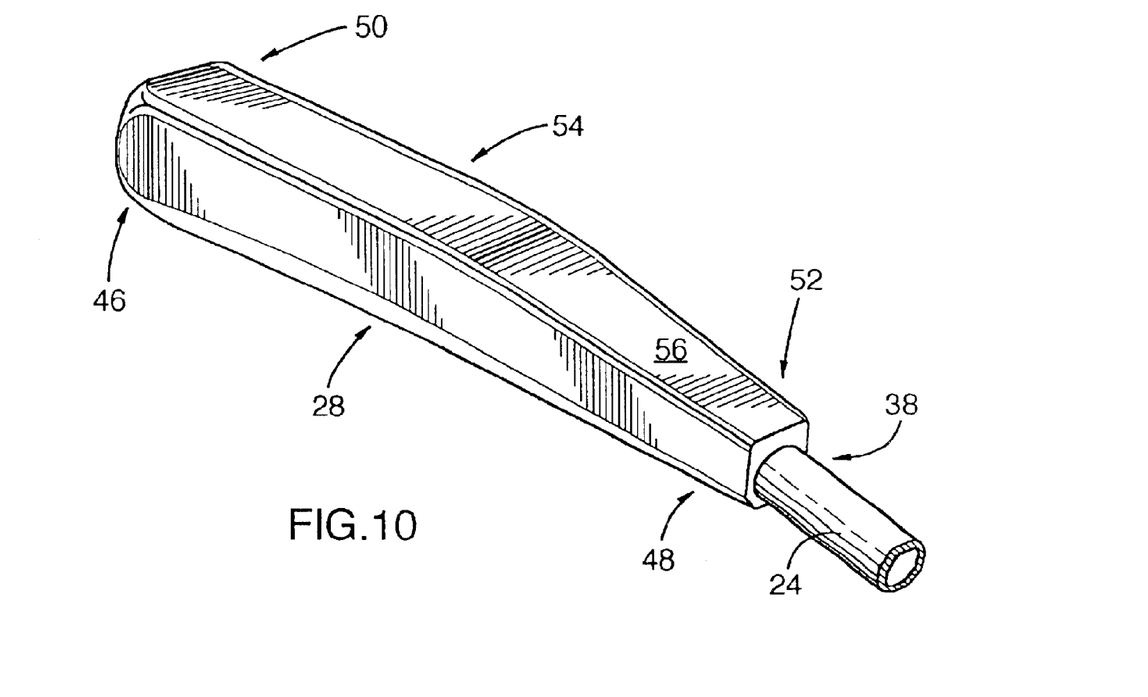
FIG. 10 is a rear, side, bottom perspective view of the putter structure of FIG. 5.
Figures 11, 12, 13:
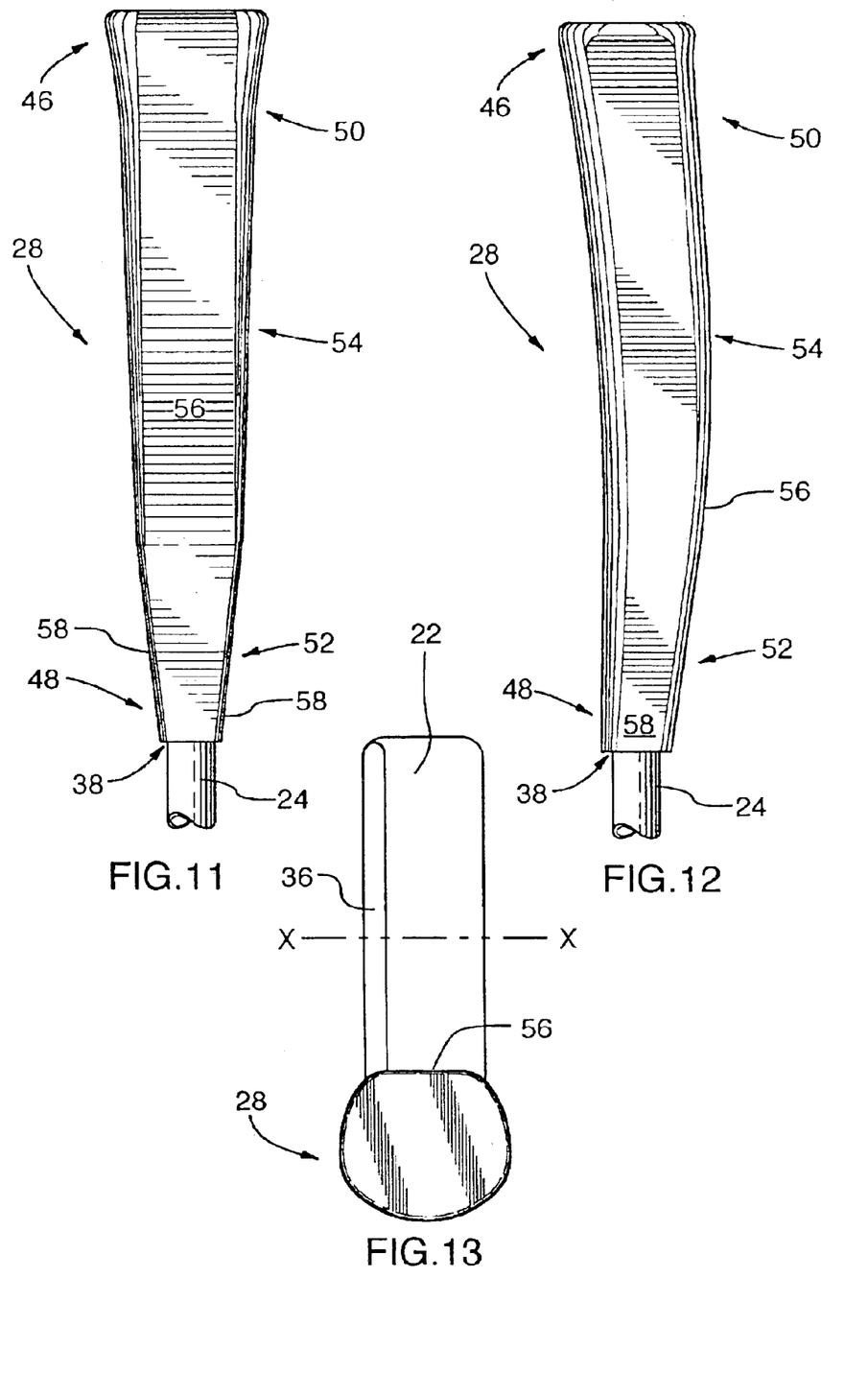
FIG. 11 is a front view of the putter structure of FIG. 5.
FIG. 12 is a side view of the putter structure of FIG. 5.
FIG. 13 is a top end view of the putter structure of FIG. 5.

With general reference to FIGS. 10–12, it will be seen that the handle 28 has a first end 46 which is disposed substantially longitudinally, upwardly from the upper end 38 of the shaft 24 and extends therefrom, substantially longitudinally, downwardly, to a second end 48 which is operatively rigidly connected (by the shaft extension 42 and the socket 44, as previously discussed) to and contiguous with the upper end 38 of the shaft 24, and tapers both in lateral width and in transverse thickness as it so extends, with sharp edges being carefully avoided. As best seen in FIG. 11, the rates of taper, in both lateral width and in thickness, are more pronounced adjacent the first end 46 and the second end 48, thereby to define a flared portion 50 of the handle 28 including the first end 46, a substantially pointed portion 52 of the handle 28 including the second end 48 and an intermediate body portion 54 connecting the flared portion 50 and the pointed portion 52. Further, and as best seen in FIG. 6 and FIG. 12, the handle 28 is generally arcuate, initially extending from the upper end 38 of the shaft 24 at a slight forward angle and curving backwardly as it nears its first end 46.

Of particular interest, the handle 28 is provided with a substantially flat thumb-receiving surface 56 on the front of the body portion 54, seen best in FIGS. 11 and 13. The thumb-receiving surface 56 has a profile that is arranged substantially parallel to the lateral axis X—X (as best seen in FIG. 13) and to the longitudinal axis Y—Y, and a pair of substantially flat finger-receiving surfaces 58, seen best in FIG. 10, which are disposed on opposite lateral sides of the pointed portion 52 and arranged substantially normal to the thumb-receiving surface 56.

The foregoing structure admits the use of a novel gripping technique, best indicated in FIG. 5 through FIG. 9, wherein the handle 28 is shown in combination with the hands of a user, configured in said grip (with hidden portions of the handle shown in phantom outline.) In the grip, the thumbs of the user point substantially towards the club head 22 and are disposed in side-by-side relation upon the thumb-receiving surface 56; the index finger of each hand lies against the thumb of each hand and against a respective one of the finger-receiving surfaces 58; the tips of the middle fingers of said hands touch one another and lie against the rear of the handle 28, with portions of the middle finger of each hand lying against respective finger-receiving surfaces 58 and against the index finger of said each hand; and the ring and small fingers of the hands are intertwined.

Figure 14:
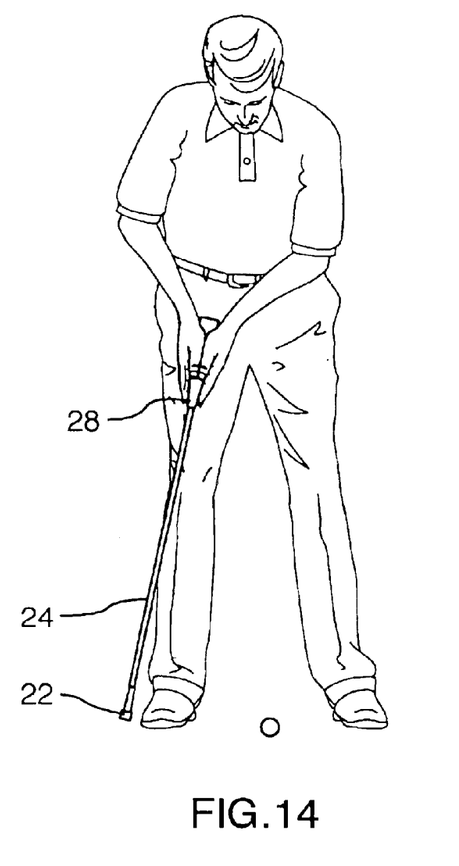
FIG. 14 is a view similar to FIG. 1, showing the putter swung to one side to strike the ball.
Figure 15:
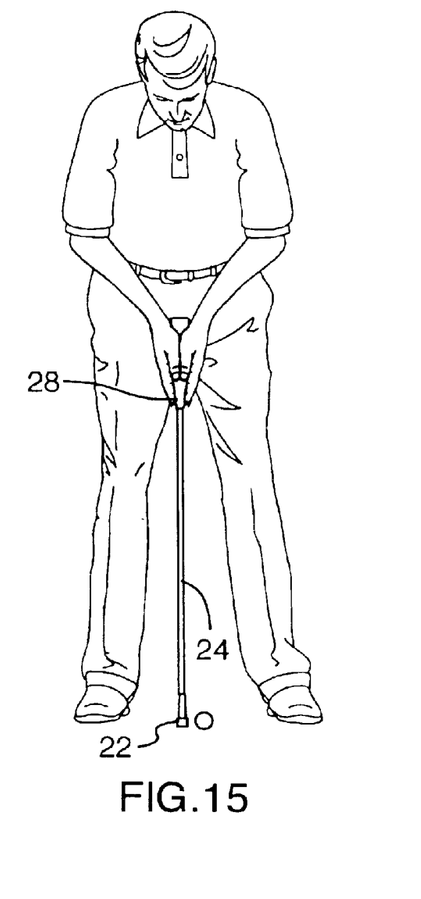
FIG. 15 is a view similar to FIG. 14, showing the golfer in midstroke, immediately prior to ball contact.
Figure 16:
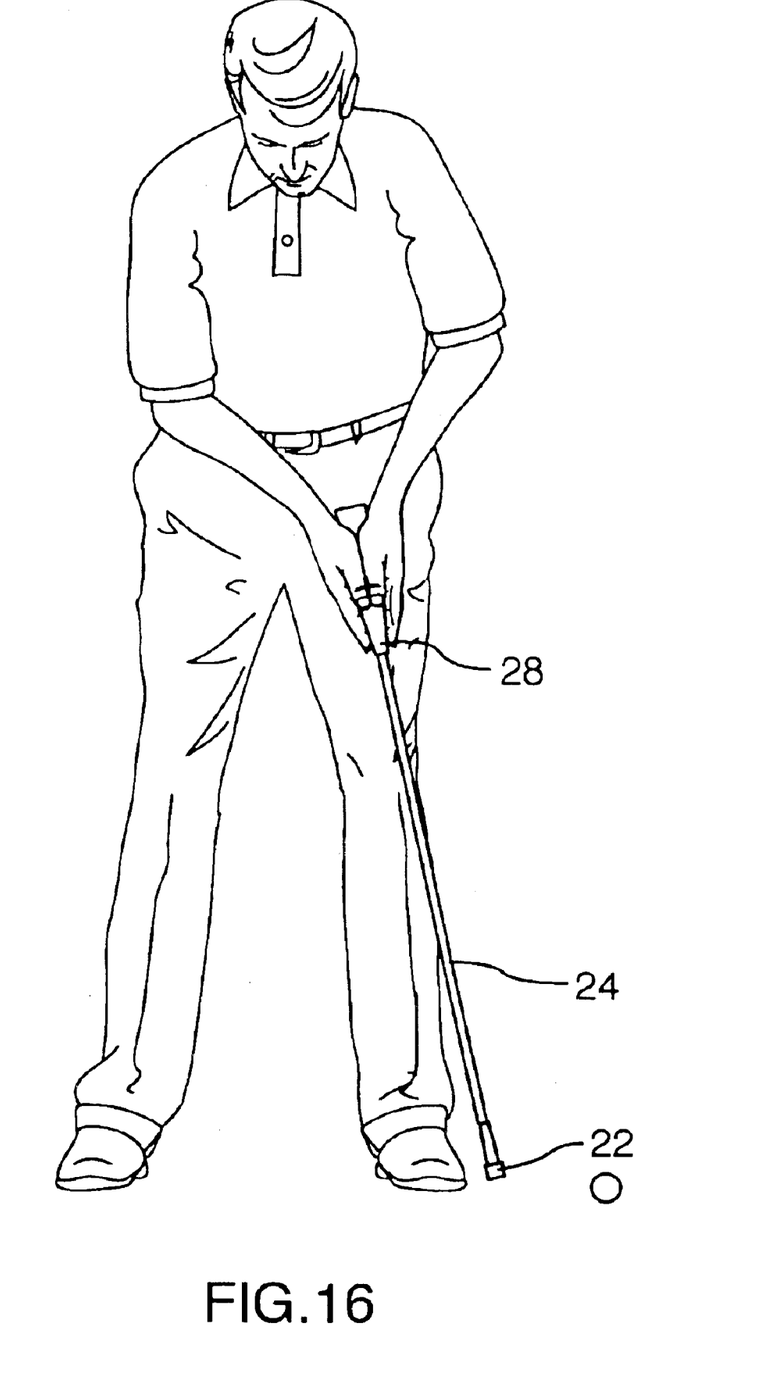
FIG. 16 is a view similar to FIG. 15, showing the golfer and ball after contact.

In use, the golfer stands in a slightly stooped position, as shown in FIG. 2, with arms lowered and shoulders even, and grips the handle 28 in the manner described above such that the club head 22 lies directly beside the ball, with its sole parallel to the ground, as illustrated in FIG. 15. To strike the ball, the golfer rotates his or her arms and shoulders, which imparts pendulum-like motion to the putter 20, as indicated in the sequence of FIGS. 14–16.

Whereas the foregoing describes an embodiment of the golf putter of the present invention which is preferred by the inventor, it is contemplated that, as is conventional in the putter industry, various geometric-type adjustments will be made to the putter so as to suit the height and style of a given user. For example, shaft length (exclusive of any shaft extension) will typically range between 28 and 36 inches; handle length will typically range between 6 and 10 inches; the lie (angle β) will typically range between 10° (the present minimum prescribed by the Rules of Golf) and 20°; and the loft (angle α) will typically range between nil and 10° (the present maximum for putters as prescribed by the Rules of Golf). On occasion, it may also be desired to provide a putter wherein the projection of the straight part of the shaft on to the vertical plane through the heel and toe diverges from the vertical; divergence of up to 20° is permissible under the present Rules of Golf. More substantial structural changes can also be made. For example, whereas the putter of the preferred embodiment includes a mallet-type club head having a striking face on each side, more traditional blade, as well as skirted-blade and other configurations may be utilized. As well, whereas the putter of the preferred embodiment utilizes a stem which enters the club head adjacent the heel, the stem can be made to enter at any point in the head, or may be omitted altogether, or provided with an offset. Of course, variations can also be made in terms of choice of materials. That is, whereas the shaft of the preferred embodiment is constructed of steel, other materials, such as wood, aluminum, graphite or fiberglass could readily be substituted. As well, whereas the handle of the preferred embodiment forms part of a separate "grip", which includes means for connection to the shaft of a putter (ie the socket)the handle could readily be formed integrally with the shaft. As well, whereas the handle of the preferred embodiment is a molded plastic product, it could readily be formed from, for example, wood or rubber. Club heads, as well, need not be limited to steel construction, and may be cast or machined from metals such as bronze, brass and aluminum, or carved from stone. Accordingly, it should be understood that the invention is limited only by the accompanying claims, purposively construed.

I claim:

1. A golf putter comprising:
    a club head having: a rear cart defining a heel; a front part defining a toe; a head axis extending between the heel and the toe; a substantially planar sole which is arranged substantially parallel to the head axis; a lateral axis lying in the plane of the sole and arranged normal to the head axis; and a planar striking face on one lateral side of the club head, the planar striking face being arranged parallel to the head axis and substantially transverse to the sole;
    a shaft having: a lower end operatively rigidly attached to the club head; an upper end disposed upwardly and rearwardly from the lower end; and a longitudinal axis extending between the upper end and the lower end, the longitudinal axis being disposed at an angle of 10–20° to a plane which is normal to the head axis and lying in a plane that is arranged substantially normal to the sole and includes the head axis; and
    an elongate handle having a first end disposed substantially longitudinally upwardly from the upper end of the shaft and extending therefrom substantially longitudinally, downwardly to a second end operatively rigidly attached to the upper end of the shaft and contiguous therewith, the handle being provided on its front, intermediate the first end and the second end, with a substantially flat thumb-receiving surface having a profile arranged substantially parallel to the lateral axis, and with the thumb-receiving surface arranged substantially parallel to the longitudinal axis, and further being provided with a pair of substantially flat finger-receiving surfaces which are disposed, adjacent the second end, on opposite lateral sides of the handle and arranged substantially normal to the thumb-receiving surface, wherein the handle tapers in lateral width and in thickness as it extends from the first end to the second end, and wherein the rates of taper in lateral width and in thickness are more pronounced adjacent the second end, thereby to define a substantially pointed portion of the handle including the second end and a body portion adjacent to the pointed portion, wherein the thumb-receiving surface is formed on the body portion of the handle, and wherein the finger-receiving surfaces are formed on the pointed portion of the handle;
    wherein the handle is shaped and dimensioned to be gripped by the hands of a user in a grip wherein: the thumbs of the user point substantially towards the club head and are disposed in side-by-side relation upon the thumb-receiving surface: the index finger of each hand lies against the thumb of each hand and against a respective one of the finger-receiving surfaces; the tips of the middle fingers of said hands touch one another and lie against the rear of the handle, with portions of the middle finger of each hand lying against the index finger of said each hand; and the ring and small fingers of the hands are intertwined.

2. A golf putter according to claim 1, wherein the handle is substantially arcuate, initially extending from the upper end of the shaft at a slight forward angle and curving backwardly as it nears its first end.

3. A golf putter according to claim 2, wherein the rate of taper in lateral width is more pronounced adjacent the first end, thereby to define a flared portion of the handle including the first end, with the body portion adjacent to the flared portion.

4. A golf putter according to claim 3, wherein the rate of taper in thickness is more-pronounced adjacent the first end.

5. A grip for a golf putter of the type having a club head having a rear part defining a heel, a front part defining a toe, a head axis extending between the heel and the toe, a substantially planar sole which is arranged parallel to the head axis and a lateral axis lying in the plane of the sole and arranged normal to the head axis; and a shaft having a lower end operatively rigidly attached to the club head and proximate thereto, an upper end disposed upwardly, rearwardly from the club head and a longitudinal axis extending therebetween, the grip comprising:

an elongate handle having a first end and a second end; and means for rigidly connecting the handle to the shaft such that the first end is disposed substantially longitudinally upwardly from the upper end of the shaft and the second end is contiguous with the upper end of the shaft, wherein the means for rigidly connecting the handle to the shaft comprises a socket provided in the handle for the shaft;

the handle being provided on its front, intermediate the first end and the second end, with a substantially flat thumb-receiving surface having a profile arranged substantially parallel to the lateral axis, and with the thumb-receiving surface arranged substantially parallel to the longitudinal axis, and further being provided with a pair of substantially flat finger-receiving surfaces which are disposed, adjacent the second end, on opposite lateral sides of the handle and arranged substantially normal to the thumb-receiving surface, wherein the handle tapers in lateral width and in thickness as it extends from the first end to the second end, and wherein the rates of taper in lateral width and in thickness are more pronounced adjacent the second end, thereby to define a substantially pointed portion of the handle including the second end and a body portion adjacent to the pointed portion, and wherein the rate of taper in lateral width is more pronounced adjacent the first end, thereby to define a flared portion of the handle including the first end, with the body portion adjacent to the flared portion, wherein the handle is shaped and dimensioned to be gripped by the hands of a user in a grip wherein: the thumbs of the user point substantially towards the club head and are disposed in side-by-side relation upon the thumb-receiving surface; the index finger of each hand lies against the thumb of each hand and against a respective one of the finger-receiving surfaces; the tips of the middle fingers of said hands touch one another and lie against the rear of the handle, with portions of the middle finger of each hand lying against the index finger of said each hand; and the ring and small fingers of the hands are intertwined.

6. A grip according to claim 5, wherein the rate of taper in thickness is more pronounced adjacent the first end.

* * * * *